United States Patent [19]

Grizmala et al.

[11] Patent Number: 4,947,425

[45] Date of Patent: Aug. 7, 1990

[54] ECHO MEASUREMENT ARRANGEMENT

[75] Inventors: Fredrick Grizmala, Lincroft; Barnet M. Schmidt, Oradell; George Sultana, Oakhurst, all of N.J.

[73] Assignee: AT&T Bell Laboratories, Murray Hill, N.J.

[21] Appl. No.: 428,081

[22] Filed: Oct. 27, 1989

[51] Int. Cl.⁵ ............................................. H04B 3/23
[52] U.S. Cl. ..................................... 379/410; 370/32.1
[58] Field of Search ....................... 379/406, 410, 411; 370/32, 32.1

[56] References Cited

U.S. PATENT DOCUMENTS

| 4,649,335 | 3/1987 | Lassaux et al. | 324/52 |
| 4,742,510 | 5/1988 | Quatieri et al. | 379/410 |
| 4,764,955 | 8/1988 | Galand et al. | 379/411 |
| 4,805,215 | 2/1989 | Miller | 370/32.1 |
| 4,813,073 | 3/1989 | Ling | 379/410 |

OTHER PUBLICATIONS

"Measurements of Echo Parameters Pertinent to High-Speed Full-Duplex Data Transmission on Telephone Circuits", IEEE Journal on Selected Areas in Comms., Sep. 1984, P. H. Wittke et al, pp. 703-710.

Primary Examiner—Jin F. Ng
Assistant Examiner—Jhancy Augustus
Attorney, Agent, or Firm—Frederick B. Luludis

[57] ABSTRACT

A digital signal processor is provided with the facility to range and converge on each of a plurality of echoes occurring at respective locations along a communications line. Specifically, the digital signal processor is arranged to adaptively process samples of a signal that has been transmitted to the communications line correlated with samples of a signal that have been received from the communications line. In the processing of the samples, the digital signal processor separates and measures the magnitude of each echo that it converges on, beginning with a so-called near-end echo. In addition, the digital signal processor calculates the propagation delay of each echo that it converges on using the number of sampling intervals that have been processed in order to position the processor on the dispersion of that echo.

10 Claims, 5 Drawing Sheets

ECHO MEASUREMENT ARRANGEMENT

FIELD OF THE INVENTION

The invention relates to measuring echo path loss in a circuit, and more particularly relates to measuring echo path loss and propagation delay of each of a plurality of echoes when they are present in the circuit.

BACKGROUND OF THE INVENTION

In a telephone circuit, it is not uncommon for multiple echoes to occur at respective points along the path of the circuit, such as at the near end and far end of the circuit. Typically, the level of the near-end echo dominates the level of far-end echoes. Because of this domination, conventional echo measuring equipment cannot distinguish the near-end echo from the far-end echo, and, therefore converge on the former echo and disregard the effect of the latter echo. Consequently, such equipment cannot accurately measure the true echo path loss of the circuit. Moreover, when presented with multiple echoes, such equipment does not separate the echoes into respective components to determine the round trip propagation delay, and, hence, the source of each component.

SUMMARY OF THE INVENTION

The failure of prior conventional equipment to accurately measure echo path loss is obviated by providing an arrangement which determines the magnitude (echo path loss) and propagation delay of the near-end as well as the far-end echoes as a result of separating the echoes. The domination of the near-end echo is thus dealt with to provide an accurate characterization of the echo in the circuit. Specifically, the invention separates and measures the magnitude of each echo by adaptively converging on each echo component beginning with the near-end echo. In addition, the convergence error in the estimate of the echo obtained at each step (sample) in the adaptive procedure is recorded. When the filter converges on an echo, as indicated by a minimum mean-square error value, the magnitude of the echo is measured and its propagation delay is calculated using the number of sampling intervals required to position the adaptive filter on the dispersion of that echo.

DETAILED DESCRIPTION

In a telephone circuit, such as, for example, a so-called two-wire telephone circuit, an echo may occur as a result of a leakage path present in an element of the circuit, such as, for example, a so-called hybrid that is used to match the impedance of a 600 ohm four-wire circuit to the impedance of a 900 ohm two-wire circuit. An echo may also occur in the event that the impedance of the two-wire circuit is not accurate and, therefore, does not match the 900 ohm impedance that the hybrid presents to the circuit. Accordingly, when a signal, e.g., voice signal, is transmitted through the hybrid circuit to the two-wire telephone circuit a so-called near-end echo is generated as result of the mismatch.

It is well-known that a telephone circuit extending from an originating station to a terminating station may be composed of different types of transmission facilities, such as microwave, satellite, etc. In such instances, the two-wire path is typically converted to a four-wire circuit using a hybrid to interface the two-wire circuit with another type of transmission facility. Therefore, an echo may occur at the point of such conversion, which may be some distance from the near end. In addition, another echo may occur at a point where the four-wire circuit is then converted back to a two-wire circuit, and so on, thereby resulting in a plurality of echoes being generated and being presented to the originating station (near end).

As mentioned above, the magnitude of the near-end echo typically dominates the magnitude of the echoes generated some distance from the near end, which causes prior echo measurement circuits to focus on the near-end echo and disregard the effect as well as the propagation delay of other echoes that may be present in the circuit. Accordingly, the echo-path-loss measurement outputted by such prior equipment may not be accurate. In addition, the failure to determine the propagation delay of each echo that may be present in a circuit makes it extremely difficult for a user, e.g., a craftsperson, to determine the location of the source of the echo and take corrective action to eliminate, or repair, the echo causing condition.

Figure 1:
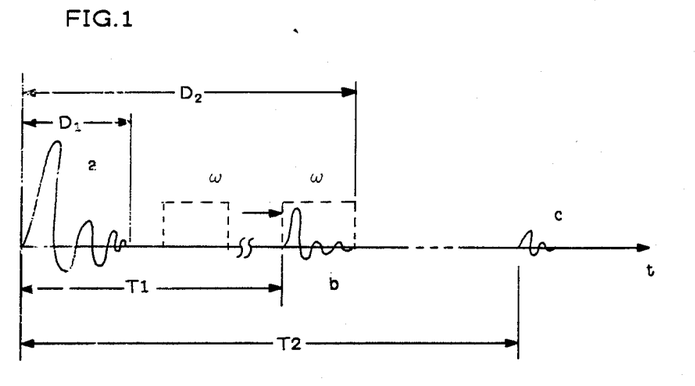
FIG. 1 illustrates a plurality of echoes that may occur as result of impedance discontinuities in a telephone line.

With the foregoing in mind, and for the sake of brevity, the following discussion will deal with three echoes occurring in a telephone line, such as, for example, a two-wire telephone circuit, when a signal within the voice signal range is transmitted over that circuit, as shown in FIG. 1. It is to be understood of course that the foregoing is to not be construed as a limitation, since, as will be shown below, our arrangement is capable of dealing with more than three echoes and works equally well with a four-wire interface circuit.

In particular, the signal labeled "a" in FIG. 1 represents the output of an adaptive finite impulse response (FIR) filter, in which the filtered response characterizes the amplitude of a respective near-end echo that may occur as a result of an impedance mismatch between the output impedance of a hybrid and the impedance of the telephone circuit. Similarly, signals "b" and "c" represent the amplitude response of the adaptive filters which characterize respective echoes that may occur some distance from the near end, i.e., so-called intermediate and far-end echoes, respectively. It is seen from FIG. 1, that the magnitude of signal "a" is substantially greater than the magnitude of either signal "b" or "c". It can be appreciated that the propagation delay of signal "a" is substantially zero, meaning that the delay between the transmitted and received signals is substantially zero.

It is also seen from FIG. 1 that the filtered responses "b" and "c" characterizing the intermediate and far-end echoes, respectively, are associated with respective propagation delays T1 and T2. As will be shown below, these delays are determined by, in accordance with an aspect of the invention, summing the respective number of samples of the transmitted signal that are processed to locate and converge on the intermediate and far-end echoes, respectively.

In a preferred embodiment of our invention, a digital signal processor (DSP), for example, the DSP 16 available from AT&T, is employed and programmed in the manner discussed below to emulate—illustratively three cascaded adaptive FIR filters—to locate and converge on the near-end, intermediate and far-end echoes, respectively. The output response of each filter obtained from a current sequence of samples of the transmitted signal convolved with the coefficients of the respective filter is processed with a corresponding sample of the received signal to provide an error signal. A least-means-squares (LMS) algorithm then processes the error signal to generate a new set of filter coefficients which are then used to filter the next sample of the transmit signal. The LMS algorithm continues in this manner until the value of the error signal reaches a minimum, indicating that the respective filter has converged on an echo, such as, for example, the near-end echo. When an FIR filter converges on an echo, the DSP then uses the last set of filter coefficients that were generated to obtain convergence in a power sum calculation to generate the echo path loss.

The DSP is also programmed to determine the propagation delay of each echo that it locates, in the manner mentioned above.

Figure 2:
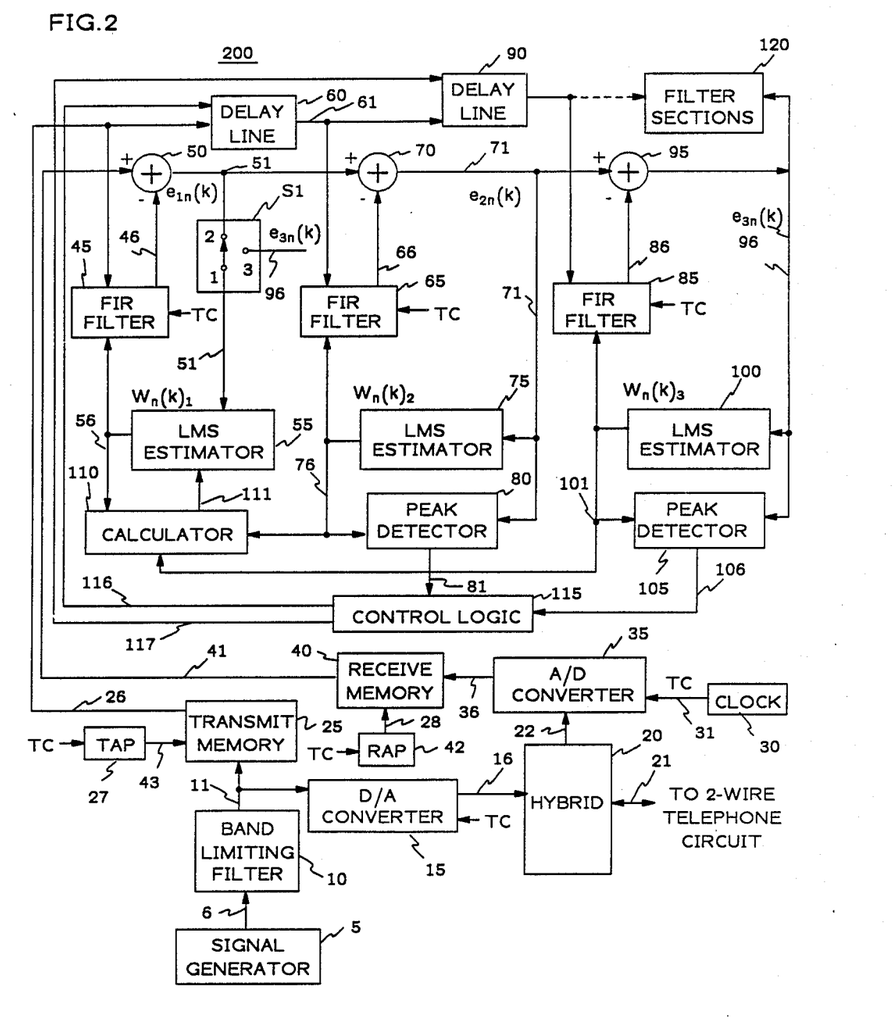
FIG. 2 is a functional block diagram illustrating the principles of the invention.

In order to discuss our invention in terms of discrete components, reference will be made to FIG. 2 which shows a functional block diagram of echo measurement system 200 arranged in accord with our invention. It is to be understood that the arrangement of FIG. 2 is not to be construed as a limitation of our invention, since other arrangements could be devised to perform the functions that will be discussed below and still be within the spirit and scope of our invention.

Specifically, echo measurement circuit 200 includes clock circuit 30 which generates and outputs to lead 31 extending to various ones of the circuit elements a clock signal TC having a predetermined clock rate, for example, 62.5 microseconds. Circuit 200 also includes digital signal generator 5 arranged to output to lead 6 a predetermined digitized signal, for example, a so-called white noise signal. Bandlimiting filter 10 limits the bandwidth of the digitized white-noise signal to—illustratively four Kilohertz (Khz)—and supplies the result to digital-to-analog converter 15 via lead 11. Converter 15, in turn, presents to hybrid 20 via lead 16 an analog version of the digitized band-limited, white-noise signal. Hybrid 20 is designed to match the impedance of circuit 200 with the expected impedance of two-wire telephone line 21 and is used to transmit the analog version of the band-limited, white noise signal to two-wire telephone line 21. (hereinafter two-wire telephone line 21 will also be referred to as line 21.)

After allowing sufficient time for the impulse response of line 21 to "settle down", circuit 200 enters a data collection interval comprising, for example, one second. During this interval, circuit 200 stores at sequential locations of a transmit memory 25 via lead 11 respective digital samples of the signal that is being transmitted to line 21. Circuit 200 also collects during the same one-second interval digital samples of the analog signal that line 21 is returning to hybrid 20. That is, hybrid 20 presents the analog signal to analog-to-digital converter 35 via lead 22. Converter 35 samples the analog signal at the TC clock rate and supplies each such sample to lead 36 for storage in respective sequential memory locations of receive memory 40.

As briefly mentioned above, it is assumed that line 21 returns to hybrid 20 three echoes, namely a near-end echo, intermediate echo and far-end echo. Accordingly, digital representations of those echoes should be contained in the samples that are stored in memory 40 over the course of the one-second interval. At the end of the one-second interval, circuit 200 then begins to process the stored samples to range and converge on aforementioned echoes.

In particular, circuit 200 initializes the contents of transmit address pointer (TAP) 27 so that it points to the respective memory 25 location containing the first of the samples of the signal that was transmitted to line 21 during the one second interval. Similarly, circuit 200 initializes receive address pointer (RAP) 42 so that it points to the respective memory 40 location containing the first of the samples of the signal received from line 21 during the one-second interval. Thereafter, the contents of TAP 27 and RAP 42 are sequentially incremented by a value of—illustratively one—in step with respective TC clock pulses outputted by clock circuit 30. Circuit 200 then begins to unload from memories 25 and 40 a sample of the transmit and receive signals, respectively, and supplies the former sample to near-end FIR filter 45 via lead 26. FIR filter 45 may be a filter having a length of, for example, 2.5 milliseconds. That is, filter 45 comprises a chain of 40 registers (2.5 milliseconds/62.5 microseconds=40) for sequentially storing a like number of samples as each is received via lead 26. The current sequence of digital samples contained (stored) in the registers are multiplied by respective filter tap coefficients (W0–W39), which are initially set to the value of, for example, zero. The results of the multiplications are then summed together to generate and output a digitally filtered version of the sequence of samples of the transmit signal currently contained in filter 45. When the summation is completed, the next TC clock signal causes each sample to shift down the chain by one position to the next register circuit, thereby preparing the first register in the chain to receive the next sample $X_n$ of the transmit signal that is outputted from memory 25 to lead 26. Thus, each digital sample of the transmit signal propagates through each stage of FIR filter 45 such that filter 45 iteratively and recursively filters each sample that it receives with samples priorly received via lead 26.

The impulse response of filter 45 to the then current series of samples $X_n$ contained therein may be mathematically stated as follows:

$$y_n(l) = \sum_{k=0}^{k=N-1} W_n(k)X_n(l - k) \qquad (1)$$

where N is the order of FIR filter 45, k is a tap index, l is an input or output sequence index and n is the iteration. Thus, with each iteration (pulse) of the TC clock signal, circuit 200 unloads a sample from memory 25 and presents it to filter 45 for processing in accordance with equation (1).

Each sample of the received signal unloaded from memory 40 is, on the other hand, supplied to one input (+) of subtractor circuit 50. In addition, each response (output) of filter 45 to the then current series of digital samples of the transmit signal contained therein is supplied to the other input (−) of subtractor 50 so that the value of the output response of filter 50 may be subtracted from a respective value of the corresponding receive sample. The difference, which we call an error signal, is then supplied to estimator circuit 55 via lead 51.

Estimator circuit 55, using a least-mean-square (LMS) adaptive algorithm, changes the values of the tap coefficients of filter 45 commensurate with the value of the latest error it receives via lead 51. Circuit 55 does so in accordance with the following illustrative equation to minimize the error between the output of filter 45 and the corresponding received signal sample:

$$W_{n+1}(k) = c\, W_n(k) + 2\mu e_n X(k) \qquad (2)$$

where $W_n(k)$ is the current value of the tap coefficient; $W_{n+1}(k)$ is the value of the updated coefficient; c is a so-called leakage constant having a value of, for example, 0.99994; $\mu$ is a constant, or gradient, having a value of, for example, 0.00195; $e_n$ is the current value of the error signal: $X(k)$ is the current value of the kth sample of the transmit signal; k is a tap index identifying the respective tap coefficient, or register stage; and n is the iteration.

After a sufficient number of samples have been processed, the extent of such changes should begin to decrease, thereby indicating that the response of the filter 45 is beginning to characterize the near-end echo, i.e., the response of the filter 45 is beginning to converge on that echo.

Thereafter, as each additional sample of the transmitted signal is supplied to filter 45 (i.e., iteration) and the corresponding sample of the receive signal is supplied to subtractor circuit 50, the value of the error is further decreased responsive to circuit 55 further changing the values of filter tap coefficients. Accordingly, filter 45 is further driven toward converging on the near-end echo. Shortly thereafter, the error signal reaches a minimum value, thereby indicating that filter 45 has converged on the near-end echo.

In practice, we have found that filter 45 quickly converges on the near-end echo within, for example, several hundred samples, of the transmit and receive signals. Quick convergence is achieved due to the fact that the propagation delay of the near-end echo is substantially zero. However, to allow for some error in the processing of the samples, we wait until a predetermined number, e.g., 1200 samples of the transmit signal, have been processed before we "freeze" the values of the filter 45 coefficients.

It can be appreciated that an echo having an appreciable amount of propagation delay trails in time the transmit signal that produced that echo. Thus, to locate the intermediate echo (and thereafter the far-end echo) the transmit signal samples have to be correlated in time with their corresponding receive signal samples. Therefore, to locate and separate the next, or intermediate echo from the near-end echo, circuit 200 supplies the samples of the transmit signal to a delay line 60 of variable length. The output of delay line 60 is then supplied to FIR filter 65 via lead 61.

In an illustrative embodiment of the invention, the value of the delay (shown as D1 in FIG. 1) that is inserted in delay line 60 is equal to, for example, five milliseconds, which effectively equals 80 transmit samples (80×62.5 microseconds). That is, to implement delay line 60, the current address contained in transmit memory address pointer TAP 27 as driven by the TC clock signal backed-up by 80 addresses. For example, if the current address contained in TAP 27 happens to be, for example, 1200, then that address is backed-up to address 1120.

Circuit 200 then begins the ranging process to correlate in time the samples of the transmit signal that are sequentially supplied to filter 65 with their corresponding samples of the receive signal that are supplied to the input of subtractor circuit 50. In addition, circuit 200 saves at respective predetermined locations of memory 25 a copy of the address currently contained in receive memory address pointer (RAP) 42 and a copy of the revised address that is now contained in transmit address pointer (TAP) 27. (The reason for saving a copy of those addresses will become apparent below.)

(As will be seen below the ranging process effectively implements a window, which ranges, or moves, over the stored samples of the transmit signal. Briefly returning to FIG. 1, window "w" is initially positioned by the action of the delay line so that it covers approximately 1200 samples, beginning with, for example, the 1200-80, or 1120th sample. In addition, if circuit 200 does not converge on the intermediate echo within that range of samples, then window w is moved in time so that it covers a new set of samples, beginning with, for example, the 1200th sample. Thus, window "w" is moved in increments of five milliseconds, or 80 samples from its initial position, until is it positioned over the intermediate echo as shown in the FIG.)

It can be appreciated that each stored sample of the received signal contains a component of the near-end echo, which affects the ability of the filter 65 to converge on an intermediate echo that may be present in telephone line 21. This problem is dealt with by, in accordance with an aspect of the invention, recognizing that the error signal that is now outputted by subtractor 50 contains components of the intermediate and far-end echoes, but does not contain a component of the near-end echo. Accordingly, the error signal that is outputted by subtractor 50 is supplied to one input (+) of subtractor 70, rather than the corresponding sample of the receive signal that is unloaded from memory 40.

With the foregoing in mind, circuit 200 sets the coefficients of FIR filter 65 to zero and then begins what we call a coarse ranging and conversion process by supplying to filter 65 the sample of the transmit signal stored at the memory 25 address defined by the current contents of TAP 27. Similarly, circuit 200 supplies to subtractor 50 the sample of the receive signal stored at the memory 40 location defined by the current contents of RAP 42. Thereafter, succeeding samples of those signals are supplied, one at a time, to the input of filter 65 and subtractor 50, respectively, as pointers 27 and 42 are sequentially incremented by a count of one responsive to receipt of respective TC clock signals.

Filter 65, which has a length of, for example, 5.0 milliseconds (i.e., a chain of 80 registers), iteratively and recursively filters each sample as it is received via lead 61 and outputs the filtered response to one input (−) of subtractor 70. Thus, as was similarly done at filter 45, the value of each signal $e_{2n}(k)$ outputted by filter 65 responsive to receipt of the latest sample of the transmit signal is subtracted from the corresponding error signal $e_{1n}(k)$ outputted by subtractor 50. The difference $(e_{n2}(k))$ signal computed by subtractor 70 is then supplied via lead 71 to estimator circuit 75, which also implements the aforementioned LMS algorithm.

Similarly, circuit 75 changes the coefficients ($W_{2n}$) of filter 65 via multilead bus 76 commensurate with the value of the error signal that it receives from subtractor 70, and continues to do so until the value of that error reaches a minimum, thereby indicating that filter 65 has somewhat converged on the intermediate, or next, echo that may be present in telephone line 21.

In the event that FIR filter 65 does not range and converge on the intermediate echo within a set of 1200 samples of the transmit signal and corresponding samples of the receive signal, then circuit 200 by way of logic circuit 115 restarts the coarse conversion process by (a) inserting another delay of five milliseconds in delay line 60 via lead 116 (i.e., moving window "w" in time by 80 samples), (b) resetting the tap coefficients of filter 65 to zero, (c) loading the priorly saved memory 40 address into RAP 42 and the last saved memory 25 address into TAP 27. What is meant herein by inserting another (and successive) five millisecond delay in delay line 60 is the act of loading in TAP 27 the last TAP 27 address that was saved in memory 25 incremented by a value of 80 (i.e. five milliseconds). Thus, if the last saved memory 25 address happens to be, for example, 1200, then address 1280 is loaded in pointer 27. It can be appreciated at this point that the action of inserting another five millisecond delay in delay line 60 in the manner just described implements a technique that iteratively ranges on the intermediate echo, as described above in connection with window "w" of FIG. 1.

Accordingly, circuit 200 restarts the coarse ranging and conversion process by supplying a next set of 1200 respective samples of the transmit and receive signals to filter 65 and subtractor 50, respectively, beginning with the samples stored at respective memory 25 and 40 locations, as defined by the currents contents of TAP 27 and RAP and 42, respectively.

Circuit 200 continues the ranging process until the value of the error signal $e_{2n}(k)$ begins to decrease. To monitor such a decrease, circuit 200 employs peak detector circuit 80, which is arranged to track the value of the error signal outputted by subtractor 70. When circuit 80 finds that the current value of error signal $e_{2n}(k)$ power has decreased to a particular value, for example, a value that is approximately equal to 25 percent of its initial value, then circuit 80 notifies control logic circuit 115 via lead 81 to stop the coarse ranging process.

Circuit 115 responsive to that notification, institutes what we call a fine ranging and conversion process. In this process, the position of window "w" over the echo dispersion is adjusted so that the major peak of the filtered response appears in a particular interval of window "w". For example, a filter having 80 taps (and hence 80 tap coefficients) is divided in eight intervals with each interval having ten coefficients. The major peak, which is that subset of coefficient containing the maximum amplitude, or magnitude, is then positioned within the first of the eight intervals. This is done so that the propagation delay of the intermediate echo and any subsequent echo (e.g., the far-end echo) may be measured relative to a consistent "milestone", i.e., the major peak of the respective filtered response.

Specifically, for a filter having 80 taps, such as filter 65, the fine ranging algorithm calculates the sum of the squares of the values of the coefficients in each interval and stores the result in memory. The sum of the squares of the coefficients in an interval represents the normalized power contained within those coefficients. When the sum of the squares for each interval is completed, the fine ranging process then searches through the results to locate the maximum sum, i.e., the interval containing those coefficients representing the greatest level of power. When that interval is located, the fine ranging process then notes the displacement of the interval from the first tap of the filter. The displacement thus indicates the number of taps that the major peak is from the beginning of the filter. The propagation delay as determined by the coarse ranging process is then modified to account for the aforementioned displacement.

As briefly mentioned, the propagation delay obtained from the coarse ranging process is determined by, in accordance with an aspect of the invention, summing the number of five millisecond delays that were inserted in delay line 60. That is, by multiplying the number of samples that were processed up to the point that filter 65 converged on the intermediate echo by the sampling rate, e.g., the 62.5 microsecond rate of the TC clock signal. The modification of the value of the propagation delay obtained from the coarse ranging process is then achieved by adding thereto the number of taps representing the value of the displacement in time. After the fine ranging process has been completed, the major peak of the impulse response will thus lie within the first 25 percent of the adaptive filter dispersion interval. The final resolution of this procedure is therefore one-eighth of the temporal coverage obtained by the adaptive filter, which in the present case is one-eighth of 5.0 milliseconds, or 625 microseconds.

Following the foregoing, circuit 200 then ranges on the far-end, or third, echo that may be present in telephone line 21. It can be appreciated that the way in which circuit 200 ranges on the far-end echo is similar to the way circuit 200 ranged on the intermediate echo. Thus, the discussion pertaining to ranging on the intermediate echo and determining the propagation delay thereof equally pertains to ranging on the far-end echo. Briefly, filter 85, subtractor 95, estimator circuit 100 and peak detector circuit 105 function similar to the way that filter 65, substractor 70, estimator circuit 75 and peak detector 80 function, respectively. Thus, circuits 85, 95, 100 and 105 form a filter section which similarly operates to range and converge on the far-end echo. It is seen from the FIG. that the latter section is preceded by delay line 90, which functionally operates similar to the way delay line 60 operates. That is, like delay line 60, delay line 90 symbolically represents the action of inserting a delay in the samples of the transmit signal that filter 85 receives to correlate those samples with the samples that are unloaded from receive memory 40.

In an illustrative embodiment of the invention, circuit 200 starts the process of ranging and converging on the far-end echo by inserting a five millisecond delay in delay 90. The total value of the delay inserted in the path of the samples that filter 85 receives is thus the final total value of the delay that had been inserted in delay line 60 plus the five millisecond delay inserted in delay line 90 (as represented by D2 shown in FIG. 1).

If filter 95 does not range and converge on the far-end echo within the current set of 1200 samples of the transmit signal, then another five millisecond delay is inserted in delay line 90 and the process is restarted. (The way in which a second and succeeding five millisecond delay is inserted in delay line 90 is similar to way it is done for delay line 60, as discussed above.)

As before, peak detector 105 notifies control logic circuit 115 via lead 106 once detector 105 detects a monitonically decreasing trend in the error signal $e_{3n}(k)$ outputted by subtractor circuit 90. Similarly, circuit 115 responsive thereto institutes the aforementioned fine ranging process.

As mentioned above, the far-end echo ranging process starts with the total delay that had been inserted in delay line 60. Accordingly, the propagation delay for the far-end echo is calculated by adding the total delay that had been inserted in delay line 60 to the total delay that is inserted in delay line 90. That is, the propagation delay of the far-end echo is calculated by multiplying the number samples that were effectively processed to range and converge on the intermediate and far-end echoes by the TC clock rate. It can be appreciated that the number of samples of the transmit signal that were processed to converge on the intermediate echo may be calculated from the memory 25 address that was contained in TAP 27 at the beginning and end of that process. A similar calculation may be employed to determine the number of samples that were processed to converge on the far-end echo and adding the result thereof to the preceding calculation.

It can also be appreciated that the foregoing procedure does not result in each filter precisely covering its respective echo. In fact, some misalignment occurs at each filter. The reason for this is that the signal (sample) fed to each of the filters 45, 65 and 85 contains elements of each of the echoes present in telephone circuit 21. To deal with this misalignment problem, a process is invoked which "finely tunes" the values of the coefficients of each of the filters. This fine tuning process is done by, in accordance with an aspect of the invention, causing the filters to operate in a true cascade mode, which is achieved by returning to LMS estimator 55 the error signal $e_{3n}(k)$. In addition, the last 1200 samples of the transmit signal that were used to obtain convergence of the far-end echo are then refiltered by the cascaded filters. At this juncture, the value of $e_{3n}(k)$ ought to be somewhat free of the elements of the near-end and intermediate echoes.

Specifically, to return the error signal $e_{3n}(k)$ to circuit 55, control logic circuit 115 causes terminal 1 of switch S1 to transfer from terminal 2 to terminal 3. In addition, control logic circuit 115 resets the contents of both TAP 27 and RAP 42 so that the aforementioned last 1200 samples of the transmit signal are supplied to filter 45 and delay line 60 via bus 26 and respective samples of the receive signal are supplied to one input (+) of subtractor 50. Since the error signal which now drives filter 45 is the error signal supplied by the far-end filter section, the reconvergence of estimators 55, 75 and 100 is now based upon complete coverage of all of the echoes in the circuit. This process therefore improves the accuracy of the value of the echo path loss calculated from the finely tuned values of the filter coefficients, since the effect of misalignment is removed from the final filtering process. The echo path loss is then calculated by calculator circuit 115 following the filtering process performed by the true cascade mode.

The echo path loss is determined by supplying the final values of the respective filter 45, 65 and 95 coefficients to calculator circuit 110 via extensions of busses 56, 76 and 101, respectively. Upon receipt thereof, calculator 110 calculates the echo path loss of line 21 for each of the echoes as a function of the respective filter coefficients. For example, calculator 110 calculates the echo path loss for the near-end echo by summing the squares of the absolute value of the final values of the filter 45 coefficients and then multiplying the base 10 logarithm of that result by a minus ten to yield the near-end echo path loss in decibels relative to the signal that was transmitted.

The way in which calculator determines the echo path loss for the near-end echo may be stated mathematically as follows:

$$-10 \log \sum_{k=0}^{k=N-1} |W_k|^2 \qquad (3)$$

where N is equal to the number of filter coefficients for FIR 45. Calculator 100 then goes on to calculate using equation (3) the echo path loss for the intermediate and far-end echoes, and outputs to lead 111 the result of each calculation as well as the value of the respective propagation delay.

Although the foregoing was discussed in terms of ranging and converging on three echoes, our invention may be easily expanded to handle more than three echoes. For example, a number of additional sections may be added to circuit 200, in the manner shown for section 120. Specifically, section 120 includes the elements shown for ranging and converging on the intermediate and far-end echoes. That is, section 120 includes a delay line which receives the output from delay line 90, an adaptive filter, subtractor circuit, error adjusting circuit and a peak detector.

Figure 3:
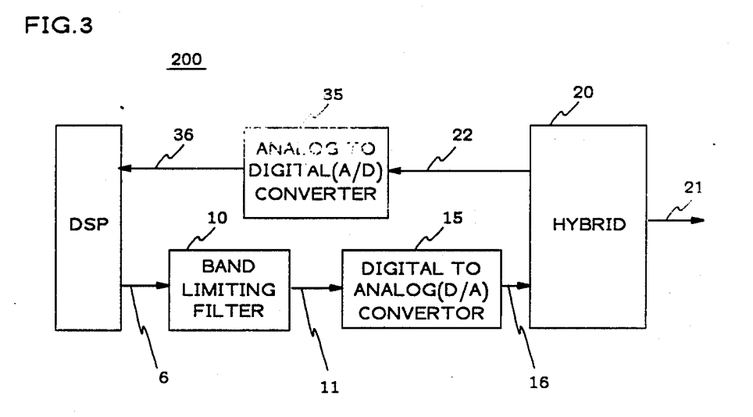
FIG. 3 is a broad block diagram of a digital signal processor in which the invention is preferably implemented.

As mentioned above, a preferred embodiment of the invention is illustratively implemented on a Digital Signal Processor (DSP), as shown in FIG. 3. In our DSP arrangement, the rate of the sampling clock TC may be set to one of plurality of sampling rates, for example, a sampling rate of 8 Khz, 16 Khz, etc. In addition, our arrangement is set to track a maximum propagation delay, such as, for example, 150 milliseconds for domestic applications and 600 milliseconds for international applications, as will be pointed out below in connection with a discussion of program which implements our invention in a DSP.

Figure 4:
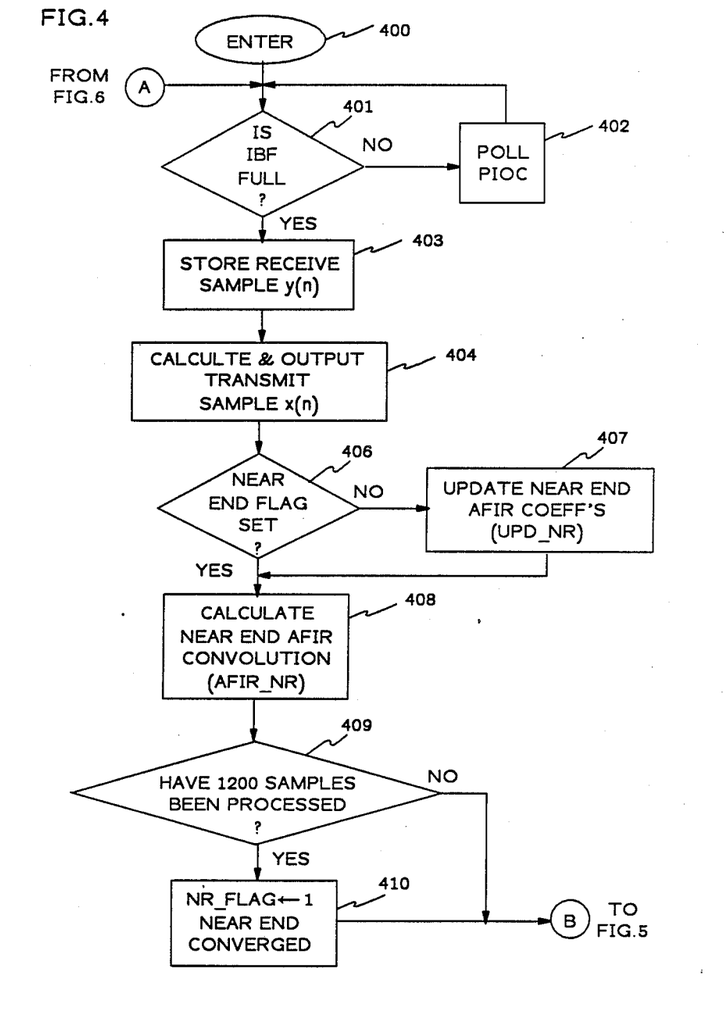
FIGS. 4-6 are flow charts of a program which implements the invention in the digital signal processor of FIG. 3.

Turning then to FIG. 4, when the program is entered at block 400 it proceeds to block 401 where it determines whether it has received a complete sample of the receive signal. The program proceeds to block 402 if such a sample has not yet been received. At block 402, the program polls a so-called parallel I/O control buffer contained in the DSP to obtain an associated buffer full bit. If the buffer full bit is set, indicating that the input buffer has been filled with a sample supplied by converter 35, then the program proceeds to block 403 via block 401. If the program finds that the buffer full bit is not set, then it remains in the loop defined by blocks 401 and 402.

At block 403, the program stores the new sample of the received signal in the receive memory and proceeds to block 404. At block 404, the the band-limited white noise generator calculates a new transmit sample and supplies an analog version of the result to line 21. In addition, the program stores the transmit sample in the transmit memory. As mentioned above, the program continues this process for a predetermined period of time. e.g., one second.

The program proceeds to block 406 at the end of the one second data collection interval where it begins to range and converge on the near-end, intermediate and far-end echoes.

In particular, at block 406, the program tests the value of a near-end echo flag to see if that flag is set to determine whether or not the near-end adaptive filter has converged on the near-end echo. In an illustrative embodiment of the invention, 1200 samples are processed for near-end convergence, since the adaptive filter is known to converge in less than that number of samples, as mentioned above. The program proceeds to block 408 if it finds that the near-end flag is set. Otherwise, it proceeds to block 407 indicating that the aforementioned number of samples have not been processed.

At block 407, the program enters a software routine identified as UPD.NR, which updates the values of the coefficients of the near-end adaptive FIR filter. The program does this for all forty coefficients using equation (2). The program then proceeds to block 408 where it enters software routine AFIR.NR to calculate near-end adaptive FIR filter convolution. That is, the program calculates the filter output based on the current input and the values of the filter coefficients. The program also calculates the value of the error signal by determining the difference between the filter output and the current sample of the receive signal, and then proceeds to block 409.

Block 409 represents the decision for near-end convergence, in which the program determines whether or not it has processed 1200 samples of the transmit signal. The program proceeds to block 410 if it finds that 1200 samples have been processed, indicating that the near-end filter has converged. Otherwise, it proceeds to block 411. At block 410, the program sets a flag (NR_FLG) indicating that the near-end filter has converged. The program then proceeds to block 411.

Block 411 represents the beginning of the process which ranges and converges on the intermediate and far-end echoes, if present. It is noted that whatever near-end echo exists at this point due to the possibility that the near-end adaptive filter has not fully converged on the near-end echo, will appear as misalignment noise to the intermediate adaptive filter. However, as the near-end and intermediate filters adapt, the error, and hence, the misalignment noise, will decrease towards a minimum value.

At block 411, the program checks to see if an intermediate flag (INT_FLG) is set, which had been originally initialized to zero (cleared) prior to program being entered at block 400. Thus, this flag will remain cleared until the program ranges and converges on the intermediate echo. Accordingly, the program proceeds to block 412 when it finds that the flag is not set. Otherwise, it proceeds to block 415.

Figure 5:
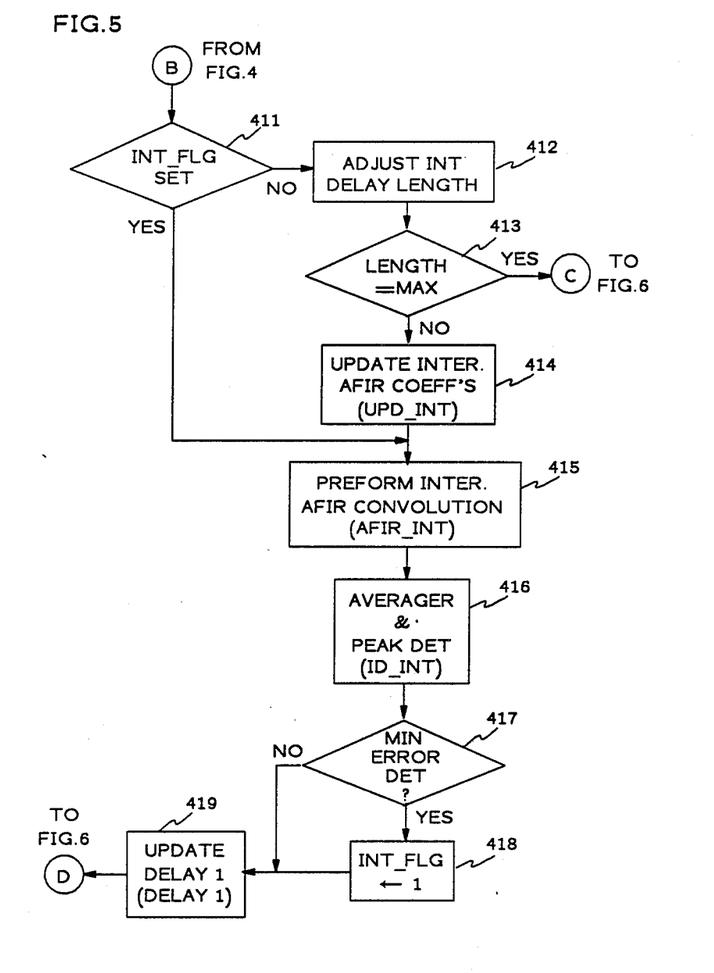

At block 412, the program adjusts the coarse ranging length of the delay line for the intermediate filter. The program does this in the manner described above, i.e., it adjusts the displacement of the transmit memory pointer relative to the receive memory pointer, thereby delineating the echo path delay for the intermediate adaptive filter. The course ranging is performed in intervals of five milliseconds for a sample rate of 8 Khz operation, or 2.5 milliseconds for a sample rate of 16 Khz. The program then proceeds to block 413. Block 413 constitutes a check for the maximum echo path delay. The maximum echo path delay corresponds to 2400 taps of the delay line for 8 Khz operation or 4800 taps of the delay line for 16 Khz operation, in which one tap of the delay line represents one sampling interval of delay.

The check for maximum length is effected by a so-called ranging mode selected. For domestic use a maximum echo path delay of 150 milliseconds is allowed and for international use, an extended range of up to 600 milliseconds is allowed. Therefore, the value used for the maximum length comparison is changed depending upon the mode selected. Accordingly, at block 413, the program proceeds to block 422 if it finds that the delay line for the intermediate filter has been reached. Otherwise, it proceeds to block 414.

At block 414, the program enters software routine UPD.INT, which is designed to update the values of the coefficients of the intermediate adaptive FIR filter. As in the near-end adaptive filter, this routine calculates 80 coefficients for the intermediate adaptive filter based on the current and past error and current and past coefficient values, using the least mean squared algorithm implemented by equation 2. The program then proceeds to block 415 where it enters the intermediate adaptive filter convolution software routine AFIR.INT. This routine calculates the adaptive filter output based on the current input and current error.

Continuing, at block 416, the program executes the peak detector using software routine ID.INT. This routine identifies the presence of an echo based on the trend of the adaptive filter error sequence, as discussed above. That is, the routine calculates the average power of the preceding 100 error signal values of the intermediate adaptive filter and stores them in memory. At the end of the convergence interval, that is, for the last 100 samples, the average error power is recorded as a converged error. If an echo is in fact covered with this particular echo path delay adjusted in the intermediate delay line at block 412, then the final value of the error signal power, or average error power, will be much less than the unconverged error power. If in fact no echo is found, then the final value, that is, the converged error, will be greater than some percentage of the unconverged error.

Thus, at block 417, the program calculates a percentage of the unconverged error power, for example 25 percent, and then compares that number to the converged error power. If the minimum error criterion is met, that is the converged error is less than or equal to the calculated percentage of the unconverged error, then the program proceeds to block 418, where it sets the intermediate course ranging flag INT_FLG. If the aforementioned error criterion is not met, then the program proceeds to block 419.

At block 419, the program updates the intermediate delay where the next echo path delay range will be tested, that is, five milliseconds for a sampling rate of 16 Khz and 2.5 milliseconds for a sampling rate of 8 Khz. The program then proceeds to block 421 where it determines the ranging interval, coarse or fine, for the far-end adaptive filter. That is, block 421 checks flag FAR_FLG to see if it is set and proceeds to block 424 if it finds that not to be the case. Otherwise, it proceeds to block 422. At block 424, the program enters software routine NEWDELY2, which is designed to adjust the length of the intermediate to far-end delay line. The routine does this by offsetting the transmit signal memory pointer by five milliseconds for a sampling rate of 8 Khz relative to the receive memory pointer, as discussed above. The program then proceeds to block 425.

Figure 6:
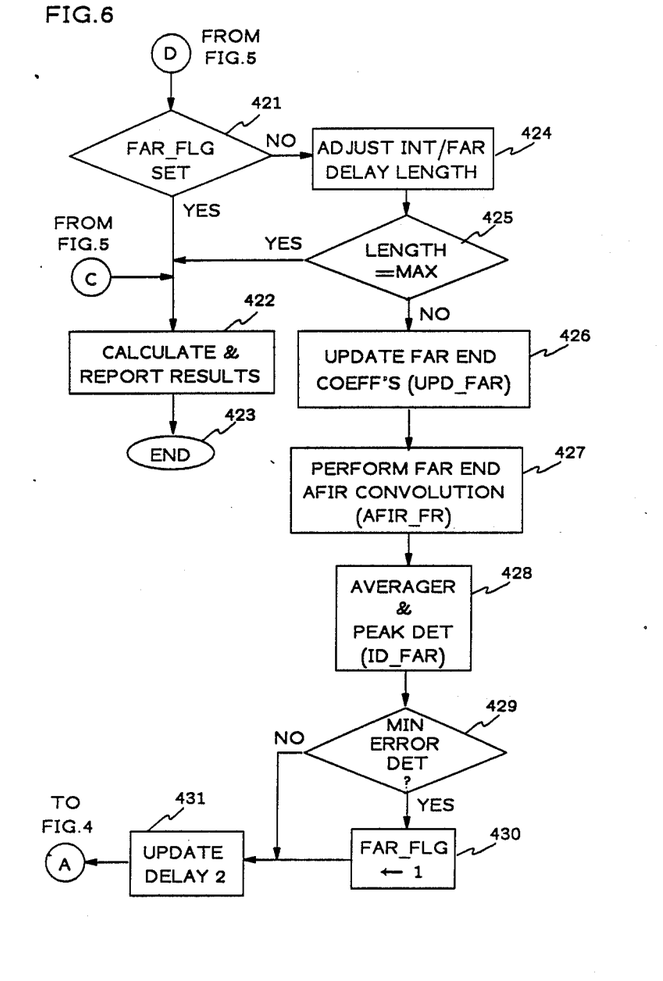

At block 425, the program compares the length of the current far-end delay line with the length of the maximum permissible delay line based on whether the domestic or international mode is invoked. The program proceeds to block 426 if it finds that such length of the delay line does not equal a maximum. Otherwise, it proceeds to block 422.

Block 426 represents the beginning of the process that ranges and converges on the far-end echo. Accordingly, block 426 enters software routine UPD_FAR to update the values of the coefficients of the far-end adaptive filter using the least-mean-square algorithm. The program proceeds to block 427 when it completes that task.

At block 427, the program enters the software routine AFIR_FR to calculate the far-end convolution and generate the current adaptive filter output. The program then proceeds to block 428.

At block 428, the program operates on the preceding 100 samples of the error signal obtained from the far-end adaptive filter process. Like block 416, block 428 identifies the presence of an echo based on the adaptive filter error sequence, in the manner discussed above. Accordingly, the program calculates and stores the average power value of the unconverged error and the converged error average power so that the minimum error threshold detector at block 429 can operate on them.

At the end of the ranging interval, the minimum error detector block 429 checks to see if the converged error power is less than or equal to the calculated percentage of the unconverged error power. If this criterion is met, then the program proceeds to block 430. If the criterion is not met, then the program proceeds to block 431. At block 430, the program sets flag FAR_FLG to a predetermined value, e.g., one, and proceeds to block 431.

Blocks 419 and 431 represent the fine ranging algorithm, as discussed above. Setting the course ranging flag on either the intermediate or far end at blocks 418 or 430, respectively, yields the echo path delay with a resolution of 2.5 milliseconds or 5 milliseconds, for 16 Khz and 8 Khz sampling rate, respectively. However, the fine ranging performed at blocks 419 and 431 adjusts the course delay with greater precision than is possible from the course ranging process itself. Thus, when the course ranging process is completed, the maximum peak of the echo path impulse response will lie someplace within the 2.5 millisecond or 5 millisecond window covered by the adaptive filter, as the case may be.

In particular, the fine ranging process is actually a peak detector that locates that one subinterval in which the sum of squares of the adaptive filter coefficients, as indexed from zero to 9, respectively, having a maximum value. To find that subinterval, a maximum search routine is used to search a record of the index of the eighty coefficients. The search is conducted in eight subintervals of the adaptive filter, in which each subinterval contains 10 coefficients. As such, the sum of squares of the coefficient having the maximum value will lie within one of the 8 subintervals. The program locates the pertinent subinterval by comparing the value of each subinterval with the value of the next subinterval, beginning with the subintervals having an index of zero and one, respectively. The program continues this comparison process until it locates the subinterval having the maximum sum of squares value. The program then adds the displacement of that coefficient from the beginning of the filter stage as identified by the index of that coefficient multiplied by the respective sampling rate adjusted in time to the coarse delay to determine the propagation delay of the respective echo, thereby yielding a final delay with a resolution of 625 microseconds.

The echo path loss associated with each of the near-end, intermediate and far-end echoes is then calculated at block 422 in accord with equation (3). The program then outputs each result along with the values of their respective propagation delays.

We claim:

1. Apparatus for ranging and converging on at least one of a plurality of echoes occurring at respective locations along a communications line comprising means for storing in a memory samples of a signal that is being transmitted to said communications line and samples of a signal that is being simultaneously received from said communications line, at least one filtering means having respective coefficients for filtering overlapping sequences of said stored samples of said transmitted signal into a plurality of filtered signals, said one filtering means including means for changing the values of said respective coefficients as a function of each of said filtered signals and respective signals representative of respective ones of said stored received signal samples and for freezing the values of said coefficients when they reach respective final values as an indication that said one filtering means has converged on said at least one echo, and means for determining the propagation delay associated with said at least one echo as a function of the effective number of said transmitted signal samples that are filtered up to the point at which said coefficients reach their respective final values.

2. The apparatus set forth in claim 1 further comprising means operative when said at least one filtering means converges on said at least one echo for finely tuning said at least one filtering means so that it covers the dispersion of said at least one echo.

3. The apparatus set forth in claim 1 wherein said at least one echo is associated with a respective echo path loss and wherein said apparatus further comprises means for determining said echo path loss as a function of the final values of said coefficients.

4. A filter circuit for ranging and converging on each of a plurality of echoes occurring at respective locations along a communications line comprising means for storing in a memory samples of a signal that is being transmitted to said communications line and samples of a signal that is being simultaneously received from said communications line, and a plurality of filtering means each having a respective group of filter coefficients, each of said filtering means being arranged to generate a filtered signal by sequentially and iteratively filtering respective overlapping sequences of said transmitted signal samples supplied to its input, a first one of said filtering means receiving at another input a respective sequence of said received signal samples and other ones of said filtering means each receiving at its other input an error signal outputted by a respective preceding one of said filtering means, said first one of said filtering means generating its error signal as a function of the value of its respective filtered signal and a respective one of said received signal samples and each of said other ones of said filtering means generating its error signal as a function of the value of its respective filtered signal and the value of the error signal that it receives at its other input, each of said filtering means converging on a respective one of said echoes by changing the values of its respective coefficients as a function of the current value of the error signal that it generates and freezing said values when the value of said error signal that it generates reaches a minimum.

5. The filter circuit set forth in claim 4 further comprising means operative when each of said plurality of filtering means has converged on its respective one of said echoes for arranging said plurality of filtering means to operate in a true cascade mode by causing the error signal generated by a last one of said plurality of means to be supplied to said first one of said plurality of filtering means and by causing each of said plurality of filtering means to re-converge on their respective ones of said echoes by supplying to each of said plurality of filtering means the sequence of said transmitted signal samples last supplied to said last one of said plurality of filtering means and by supplying to said first one of said filtering means respective receive signal samples that are correlated in time with respective ones of the samples contained in said last supplied sequence.

6. The filter circuit set forth in claim 4 wherein each of said echoes is associated with a respective echo path loss and wherein said filter circuit further comprises means for determining the echo path loss associated with at least one of said echoes that a respective one of said plurality of filtering means has converged on as function of the final values of the coefficients associated with said one of said plurality of said filtering means.

7. The filter circuit set forth in claim 4 wherein said filter circuit is a digital signal processor.

8. The filter circuit set forth in claim 4 wherein each of said plurality of filtering means changes the values of its respective coefficients in accordance with a predetermined least-means-squares algorithm.

9. The filter circuit set forth in claim 4 wherein said other ones of said plurality of filtering means receive said transmitted signal samples via respective delay lines arranged as a cascade of delay lines.

10. A method for ranging and converging on at least one of a plurality of echoes occurring at respective locations along a communications line, said method comprising the steps of storing in a memory samples of a signal that is being transmitted to said communications line and samples of a signal that is being simultaneously received from said communications line, filtering overlapping sequences of said stored samples of said transmitted signal into a plurality of filtered signals using at least one filtering means having a plurality of respective coefficients, changing the values of said respective coefficients as a function of each of said filtered signals and respective signals representative of respective ones of said stored received signal samples, freezing the values of said coefficients when they reach respective final values as an indication that said one filtering mean has converged on said at least one echo, and determining the propagation delay associated with said at least one echo as a function of the effective number of said transmitted signal samples that have been filtered up to the point at which said coefficients reach their respective final values.

* * * * *